United States Patent Office 2,722,524
Patented Nov. 1, 1955

2,722,524

SYNTHETIC LINEAR CONDENSATION POLYMERS CONTAINING SILICON

Stanley Brooke Speck, Marshallton, Del., assignor to E. I. du Pont de Nemours and Company, Wilmington, Del., a corporation of Delaware No Drawing. Application September 24, 1951, Serial No. 248,094

25 Claims. (Cl. 260—75)

This invention relates to polymeric materials and, more particularly, to new fiber- and film-forming synthetic linear condensation polymers having new and unusual properties.

This application is a continuation-in-part of my co-pending application Serial No. 106,321, filed July 22, 1949, now abandoned.

It is known to react difunctional reactants capable of yielding linear condensation polymers, under conditions such that linear condensation superpolymers are formed which can be spun into useful filaments capable of being cold drawn. Carothers U. S. Patents 2,071,250, 2,071,253, 2,130,523 and 2,130,948 in particular disclose the preparation of such linear condensation superpolymers. Those polyesters and polyamides described in the aforementioned patents, having an intrinsic viscosity greater than 0.3, are primarily useful as fiber-forming materials; and, because of their stability, high melting points, relative insolubility, etc., they are very useful in the textile and allied arts. The lower molecular weight linear condensation polymers are used with great advantages in coating compositions, and as softeners, moulding powders, etc.

An object of this invention is to provide novel superpolymers of the class of linear condensation polymers.

Another object is to provide novel linear condensation superpolymers capable of being converted into cold-drawable filaments having unusual and advantageous characteristics.

Still another object is to provide oriented filaments of novel linear condensation superpolymers, which filaments have good stability, strength, dyeing characteristics, elastic recovery, and an exceptionally high work recovery.

A further object is to provide new and highly useful fiber- and film-forming polyamides and polyesters. The foregoing and other objects will more clearly appear hereinafter.

These objects are accomplished by heating to reaction temperature difunctional reactants capable of yielding linear condensation polymers, e. g., a diprimary, disecondary or primary-secondary diamine or glycol and a dicarboxylic acid or derivative thereof, at least one of said reactants containing an atom of silicon present in the reactant or reactants as a part of the divalent radical

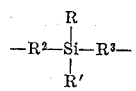

wherein R and R' are any monovalent hydrocarbon radicals and R² and R³ are divalent hydrocarbon radicals from the group consisting of divalent aromatic and cycloaliphatic hydrocarbon radicals, and continuing the reaction until a polymeric product of the desired intrinsic viscosity is obtained.

The general process of formation of the various silicon-containing intermediates involved for the preparation of this new series of silicon-containing polymers is illustrated in the following reactions. While this series of reactions merely shows the formation of a representative diamine, dihydric alcohol and dibasic acid as well as the diester of the dibasic acid, it is to be understood that the reaction may be extended by other conventional reactions to the preparation of a dihydric alcohol, an amino acid or an hydroxy acid:

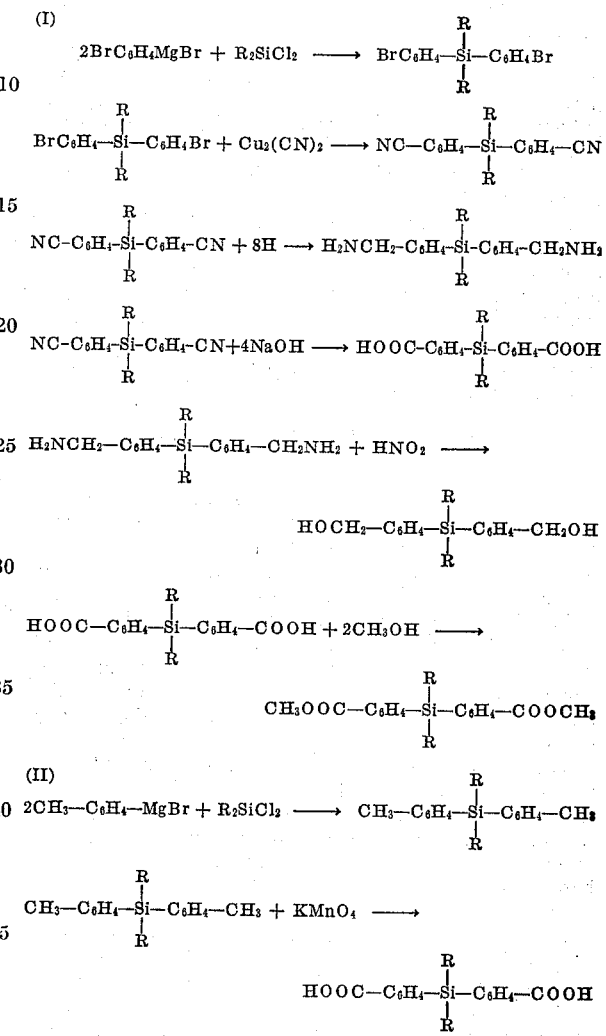

By "difunctional reactants" is meant, of course, a reactant capable of yielding a volatile product and a non-volatile product (polymer) and includes both the reactants used in preparing a polyester, i. e., a dihydric alcohol and dicarboxylic acid or ester-forming derivatives of a dibasic carboxylic acid, as well as the reactants used in the preparation of polyamides, i. e., a diamine and a dicarboxylic acid or an amide-forming derivative of a dibasic carboxylic acid.

In common with other polyesters and polyamides, the polymers of this invention may be prepared by any one of several ways. In the case of polyesters, they may be prepared by:

1. Self-condensation of a hydroxy acid.
2. Esterification of a dibasic acid or ester-forming derivative thereof by a glycol.

Similarly, polyamides may be prepared by:

1. Self-condensation of an amino-acid.
2. Condensation of a dibasic acid or amide-forming derivative thereof with a diamine.

While for maximum silicon content of the final polymer it is preferred to use difunctional reactants both of which contain the silicon atom (a self-condensing, silicon-containing material, e. g., hydroxy acid or amino acid, is comprehended, of course), it is obviously possible to reduce the silicon content in half by using one difunctional reactant containing no silicon, e. g., hexamethylenediamine or ethylene glycol.

From the above, it is apparent that all of the difunctional reactants described by Carothers as being useful in the preparation of polyesters and polyamides may be used in connection with one or more of the silicon-containing difunctional reactants described herein to form the new polymers of this invention.

In the preferred practice of the invention, the difunctional reactants are heated in proportions suitable for preparing a polymer of fiber-forming molecular weight at polymer-forming temperatures, generally in the range of 180–300° C., in the presence or absence of a diluent until the product has a sufficiently high molecular weight to exhibit fiber-forming properties. As in the case of the conventional polyesters and polyamides, the fiber-forming stage can be tested by touching the molten polymer with a rod and drawing the rod away. When this stage has been reached, a continuous filament of considerable strength and pliability is readily formed. This stage is generally the point at which the polyamide or polyester has an intrinsic viscosity of at least 0.4. Intrinsic viscosity is defined as:

$$\text{limit } \frac{ln(\eta_r)}{C} \text{ as } C \text{ approaches } 0$$

wherein ($\eta_r$) is the viscosity of a dilute solution of the polymer in meta-cresol divided by the viscosity of meta-cresol in the same unit at the same temperature, and C is the concentration in grams of the polymer for 100 cc. of solution. In the case of polyesters, the same general conditions hold except that the preferred solvent is a 60:40 mixture of phenol and tetrachloroethane. In general, measurement of the intrinsic viscosity is the most convenient method for following the course of the reaction and determining whether or not a fiber-forming product has been obtained.

The reaction by which these fiber-forming polymers may be obtained is, as indicated above, a linear condensation polymerization. It involves the formation of a by-product, such as water, alcohol, phenol, hydrogen chloride, ammonia, etc., depending upon the derivatives of the dibasic acid used in the reaction.

In general, in the case of the polyamides, they may be prepared most economically from a diamine and a dicarboxylic acid. The first reaction which occurs when the diamine and dicarboxylic acid are mixed and brought into sufficiently intimate contact is the formation of the diamine-dicarboxylic acid salts. The salt is generally crystalline and readily purified by recrystallization from a suitable solvent and is generally the starting material for the subsequent polymerization. With respect to polyesters, while they may be formed directly from the dihydric alcohol and the dicarboxylic acid, it is generally preferred to react the dimethyl ester of the desired acid with an excess of dihydric alcohol to form the bis-glycol ester of the acid with the elimination of methanol. This diester is, in turn, reacted under polymerization conditions with the elimination of the dihydric alcohol to form the polyesters of this invention.

The conversion of the diamine-dibasic acid salt or again the bis-glycol ester to a synthetic linear polymer is carried out by heating at polymer-forming temperatures, generally between 180–300° C., in the presence or absence of a diluent and under conditions which will permit the by-product of the reaction to escape until an examination of a test portion of the product indicates it has the desired fiber-forming properties. As examples of diluents which may be used in the reaction in the case of polyamides may be mentioned phenol, cresols, xylenols, diphenylolpropanes and ortho-hydroxy diphenyl. In the case of polyesters, we may mention diphenyl, diphenyl oxide and tetrahydronaphthalene. White medicinal oil is an example of a non-solvent which may be used. The first stage of the reaction can be carried out in the presence of the condensation by-product, e. g., in an autoclave under pressure. Or again, if the melt polymerization process is not desired, the polymer may be prepared by the solid polymerization process described in U. S. 2,172,374—Flory.

The polymerization reaction may be carried out at atmospheric, super-atmospheric or sub-atmospheric pressure depending upon the best conditions suitable for the polymer and method of polymerization involved. The last stages of the reaction, at least, should be carried out under conditions which permit the escape of the by-product of the reaction. Unless this is water, a vacuum will generally be desirable. Preferably, also, the reaction should be carried out in the absence of oxygen, e. g., an atmosphere of nitrogen or in a vacuum. While it is generally unnecessary to add a catalyst, inorganic materials of alkaline reaction, such as oxides and carbonates, and acidic materials such as halogen salts of polyvalent elements, e. g., aluminum, tin are often helpful. Two examples of specific catalyst that may be mentioned are zinc borate and litharge.

The polymers of this invention having an intrinsic viscosity of at least 0.4 are characterized by their fiber-forming properties, i. e., their ability to be formed into filaments which can be cold drawn to fibers showing by characteristic X-ray diffraction patterns, orientation along the fiber axis. One method (wet process) of spinning these polymers into filaments consists of dissolving them in a suitable solvent and extruding the solution through orifices into a liquid which dissolves the solvent but not the polymer, e. g., a hydrocarbon or in some instances, water, and collecting the filaments thus formed on a suitable revolving drum. Another method (dry process) consists in extruding the solution of the polymer into a heated chamber where the solvent is removed by evaporation. Still another method (melt process) consists in extruding the molten polymer through orifices into the atmosphere where it congeals into a filament. In some cases, particularly when the filaments are large, e. g., of bristle size, it may be advantageous to spin the molten material into a cooling liquid, e. g., water. By similar processes, the polymers can be formed into rods, sheets, foils, ribbons, films and the like. In the various methods of forming shaped articles from products of this invention, particularly when these articles are obtained from solution, characteristics of the filaments, etc., can be altered by blending the polymers with other polyamides and polyesters and/or resins, plasticizers, cellulose derivatives, pigments, dyes, delustrants, etc.

After spinning, the filaments are normally cold drawn since this improves their strength and elasticity. The filaments from the products of this invention vary in the extent to which they can be cold drawn, but generally the degree of cold drawing possible will lie between 150–500%. Although ribbons, sheets and the like can also be cold drawn, it is generally more advantageous to cold roll these products. By cold rolling such products in mutually perpendicular directions, it is possible to obtain products of great strength in all the directions.

Although the properties of the fibers formed from the polymers of this invention vary somewhat with the nature of the reactants used in the preparation, properties which characterize the fibers are super work recovery, good initial tensile modulus, elastic recovery, orientation along the fiber axis, as well as good strength and dyeing characteristics.

Work recovery (WR), which is a criterion of resilience, is the ratio of the amount of work done by a yarn in recovering from deformation to the work done in deforming it. To determine work recovery, a stress-strain curve is used (plotting tension as the vertical axis vs. elongation as the horizontal axis) in which the yarn is extended at a constant rate of elongation of 1% per minute. The yarn specimen is held at the maximum elongation desired for 30 seconds and then allowed to retract at the same rate at which it was extended. The same specimen is extended successively several different amounts. The areas under the elongation curve and the retraction curve, respectively, represent work performed on the material and work returned. These areas may be measured with a polar planimeter and the per cent work recovery computed by means of the relation:

$$WR = \frac{\text{Area (Work Returned)}}{\text{Area (Work Performed)}} \times 100$$

Since the quantity of interest is a ratio, the absolute values of the work terms are not necessary.

Initial tensile modulus, which is also a criterion of resilience, is defined as the slope of the first reasonably straight portion of a stress-strain curve of the yarn obtained by plotting tension as the vertical axis vs. elongation as the horizontal axis as the yarn is being elongated at the rate of 10% per minute. In almost every instance, this is also the steepest slope to be found on the curve. The values as used herein are in units of grams per denier (g. p. d.) per 100% elongation.

The preparations of typical silicon-containing, difunctional intermediates, in accordance with the general reactions hereinabove set forth, are illustrated by the following examples:

EXAMPLE A

Bis (p-carboxyphenyl) dimethylsilane a. *Bis (p-bromophenyl) dimethylsilane.*—A solution of 43 parts (1.3 moles) of dimethyldichlorosilane in 70 parts of dry ether was added slowly to the Grignard solution from 185 parts (2.3 moles) of p-dibromobenzene and 20 parts of magnesium in 315 parts of dry ether. The addition caused a mild reaction. The mixture was refluxed for 2 hours and then some of the ether allowed to distill off. There was only a small amount of precipitate at the end of this reaction. The residue was decomposed with water and the ether layer washed, dried and distilled. Appreciable quantities of bromobenzene and p-dibromobenzene were obtained in the forerun. A yield of 38 parts (31%) of a colorless oil, B. P. 155–170° C. (.2 mm.) was obtained. After several recrystallizations from ethanol, the compound was obtained as colorless needles, M. P. 72–73° C. Anal. calcd. for $C_{14}H_{14}Br_2Si$: Br, 43.2. Found: Br, 41.3.

b. *Conversion of bis (p-bromophenyl) dimethylsilane to the dinitrile.*—A mixture of 14.8 parts (.04 mole) of bis (p-bromophenyl) dimethylsilane, 8.5 parts of cuprous cyanide and 10 parts of dry pyridine was sealed at atmospheric pressure in a tube and the tube heated at 250° C. for 3½ hours. During this period, the contents were shaken several times. The dark colored liquid reaction mixture was cooled and then poured into ether. After stirring thoroughly for a few minutes, the mixture was filtered and the dark colored solid residue washed thoroughly with ether. The solid residue, 21 parts when dried, was thought to be a pyridine-cuprous cyanide complex.

The ether solution was washed several times with concentrated ammonium hydroxide then with dilute HCl and finally dried and evaporated to dryness. The residual oil, 7.5 parts, was dissolved in 20 parts of ethyl alcohol, treated with Darco and allowed to crystallize. There was obtained 5 parts of light yellow crystals, M. P. 73–74° C. Several recrystallizations from 3:1 hexane-benzene mixture gave colorless plates M. P. 100–101° C. Anal. calcd. for $C_{16}H_{14}N_2Si$: N, 10.70; Si, 10.71. Found: N, 10.84; Si, 10.87.

c. *Hydrolysis of bis (p-cyanophenyl) dimethylsilane.*—A solution of 146 parts of the dinitrile and 292 parts of KOH in 700 parts of ethyl alcohol and 580 parts of $H_2O$ was heated at reflux for about 6 hours. The solution was partially neutralized with HCl, treated with Norite and then acidified. The white precipitate was collected on a filter, washed and dried. The yield of crude acid, M. P. 185–230° C. was 148 parts (89%).

In order to purify the acid, it was converted to the methyl ester by refluxing with 720 parts of methanol and 27.5 parts of concentrated sulfuric acid for about 4 hours. Complete solution of the acid resulted after about 15 minutes refluxing. About one-half the methanol was removed and the residue allowed to cool after treating with Norite. The product which crystallized, 83 parts after washing and drying, melted at 81.5–83° C.

A mixture of 83 parts of the ester, 30 parts KOH, 42 parts of water and 300 parts of ethyl alcohol was refluxed for 2 hours. The mixture was poured into an equal volume of water, washed with ether, treated with Norite and acidified with HCl. A yield of 68.5 parts (91%) of acid, N. E.=161 was obtained. After one recrystallization from 440 parts of o-dichlorobenzene containing sufficient glacial acetic acid to bring about solution, the acid melted at 280–287° C. and had a neutral equivalent (N. E.) of 153.2 (theoretical N. E.=150).

EXAMPLE B

Bis (p-aminomethylphenyl) dimethylsilane

A charge of 85 parts of bis (p-cyanophenyl) dimethylsilane, 70 parts of liquid ammonia and 10–15 g. of Raney nickel was shaken in a bomb at 125–130° and 5000 lb./sq. in. hydrogen pressure for 3 hours. After cooling, the catalyst was removed by filtration and the mixture distilled. A viscous oil, B. P. 180–190° (.5 mm.) N. E. 140.36 was obtained. Upon cooling, this material was caused to crystallize. It was then recrystallized from a mixture of ½ its weight of absolute alcohol and twice its weight of absolute ether, by cooling to −40° C. A yield of 26 g. of white crystals, M. P. 45–47° was obtained. This material had a nitrogen content of 10.68% and a neutral equivalent of 135.5, theoretical being N=10.36% and N. E.=135.

EXAMPLE C

Bis (p-carbomethoxyphenyl) diphenylsilane a. *Ditolyldiphenylsilane.*—A solution of 750 parts of p-bromotoluene in 525 parts of absolute ether was added dropwise to a mixture of 506 parts diphenyldichlorosilane, 110 parts of magnesium and 875 parts of absolute ether. After the reaction had started, the bromotoluene was added at such a rate as to maintain refluxing. After complete addition, the mixture was refluxed for an additional hour, the ether then removed by evaporation, and the residue heated at 180° C. for 15 hours. The solid residue was then decomposed in cold water, the resulting mixture extracted twice with benzene. After washing the organic layer once with water and drying, it was distilled. The fraction distilling at 196–240° C. (.4 mm.) was collected and recrystallized once from 4 volumes of alcohol. A yield of 410 parts of ditolyldiphenylsilane, M. P. 114–115° C., was obtained. A sample purified for analysis melted at 117–118° C.

b. *Oxidation of ditolyldiphenylsilane.*—A solution of 30 parts of silane and 35 parts of water in 130 parts of pyridine was heated on a steam bath and 100 parts of $KMnO_4$ added portionwise. During the addition of $KMnO_4$, more water was added portionwise until a total of 65 parts had been added. After complete addition of the $KMnO_4$, the mixture was heated for an hour and the excess permanganate destroyed by the addition of methanol. The mixture was then filtered and the residue washed with water. The clear colorless filtrate was acidified with HCl which precipitated an oil that soon crystallized. The acid obtained was redissolved in sodium carbonate, treated with Norite and precipitated with HCl. A yield of 28 parts of acid, M. P. 250–57° C., N. E. 232 (Theory=212) was obtained.

*c. Esterification of bis (p-carboxyphenyl) diphenylsilane.*—The above acid was converted to the methyl ester by refluxing 27 parts of the acid for 5 hours with 110 parts of methanol and 7.5 parts of $H_2SO_4$. The acid went into solution after about ten minutes. In about 20 minutes, a white solid began to crystallize out. After 5 hours, the mixture was cooled and filtered, yielding 27 parts of ester melting at 162–164° C. The ester was purified by two recrystalizations from a mixture of 2:1 methanol:benzene. A pure sample melted at 169–170° C. The ester was analyzed for carbon and hydrogen. Found: C=74.32%, H=5.37%. Calculated: C=74.40%, H=5.35%.

The following examples are further illustrative of the preparation and application of the products of this invention. Parts and percentages are by weight unless otherwise indicated.

EXAMPLE I

The hexamethylenediamine salt of bis (p-carboxyphenyl) dimethylsilane is prepared by adding a solution of 12.8 parts of 61.2% hexamethylene diamine solution in methanol (4% excess) to a warm solution of 20 parts of bis (p-carboxyphenyl) diamethylsilane (N. E. equals 153.5) in 500 parts of 95% ethanol. The flocculent salt precipitates immediately and, after cooling, is collected on a filter, washed with cold alcohol and ether and then dried. The yield is 26 parts (94%) and the salt melts at a temperature of 215–220° C.

This salt is then polymerized by the standard salt fusion technique. In this particular case, the salt is heated for 1½ hours at 225° C. in an evacuated tube. A low molecular weight polymer is formed. Polymerization is continued for ½ hour at 283° C. and atmospheric pressure. It is then finished to a high molecular weight polymer by heating for ¾ hour at 283° C. at a pressure of 1–2 mm. of mercury, all the time, of course, bleeding off steam. The polymer exhibits an intrinsic viscosity of 0.81 and a softening temperature of 189° C. It is readily cast into a tough, clear, colorless film which exhibits a zero strength temperature of 165° C.

EXAMPLE II

The decamethylene diamine salt of bis (p-carboxyphenyl) dimethylsilane is prepared in exactly the same manner as described above. The salt is then polymerized using the general salt fusion technique as described above under the following specific conditions. Polymerization of the salt is initiated by heating for 2 hours at 220° C. in an evacuated vessel. This is followed by heating at 259° C. for ⅓ hour at atmospheric and then the temperature is raised to 273° C. for ⅙ hour at atmospheric pressure. Polymerization is then finished by continuing the heating at 273° C. for 2 hours under a pressure of 1–2 mm. of mercury. The polymer formed by this method exhibits an intrinsic viscosity of 0.80 and has a softening temperature of 145°. It can be melt pressed into a clear, tough, colorless film.

EXAMPLE III

A charge of 5.5 parts of bis (p-carbomethoxyphenyl) dimethylsilane, 3.2 parts of ethylene glycol and 0.006 part of zinc borate is placed in a polymer tube and a small boiling stone added to facilitate ebullition. The tube is heated in an atmosphere of nitrogen at 200° C. for 6 hours, during which time the theoretical amount of methanol is collected as distillate. The charge is then heated for 2½ hours at 259° C. to remove most of the excess glycol. Then the polymerization is completed by heating for 7 hours at 259° C. and 1–2 mm. Hg using a nitrogen-supplied capillary tube to furnish agitation.

The polymer has an intrinsic viscosity of 0.64 and may be melt pressed into a clear, colorless, tough film. The polymer is also readily spinnable and a sample of monofil, when press spun at 200° C. and 1,000 pounds per square inch pressure, exhibits the following properties after being drawn 3.5 times its original length at 100° C.:

Tenacity_____ 1.59 grams per denier (g. p. d.).
Elongation_____ 20%.
Initial tensile modulus___ 34.2.

The work recovery from 0.5%, 1% and 2% elongation is 100, 99 and 95%, respectively.

EXAMPLE IV

The polyester of bis (p-carbomethoxyphenyl) diphenylsilane with ethylene glycol is prepared in the same general manner as described in Example III. However, the conditions of time, temperature and pressure are slightly different, as shown by the following table:

POLYMERIZATION

| Time (hours) | Temperature (° C.) | Pressure (mm. Hg) |
|---|---|---|
| 5½ | 218 | Atmospheric. |
| 1 | 259 | Do. |
| 1 | 259 | 760 mm., 1.0 mm. |
| ¾ | 265 | 0.5 mm. |

This polyester has an intrinsic viscosity of 0.81 and a softening temperature of 185° C. When press spun at 230° C. and 5,000 lbs./sq. in. and drawn 2 times its original length at 160° C., it has the following properties:

| | Dry | Wet |
|---|---|---|
| Tenacity_____g. p. d.. | 0.90 | 0.93 |
| Elongation_____percent.. | 4.4 | 3.6 |
| Initial tensile modulus_____ | 30 | 34 |

Work recovery:
1%—96.
2%—93.
3%—94.

EXAMPLE V

A salt is prepared in the manner described in Example I by reacting bis (p-aminomethylphenyl) dimethylsilane with bis (p-carboxyphenyl) dimethylsilane. The polymer is prepared by first heating the salt for 1 hour at 259° C. in an atmosphere of nitrogen. The temperature is then raised to 273° C for ⅔ hour. Polymerization is concluded by heating under high vacuum for 1 hour at 273° C. The polymer is light yellow, clear and can be melt pressed in films or spun into fibers. The intrinsic viscosity is 0.52. The material has a sticking temperature of 215° C. The fibers, when press spun at 230° C. and 10,000 p. s. i. pressure followed by drawing 2X at 205° C., exhibit the following properties:

Tenacity_____ 1 g. p. d.
Elongation_____ 5%.
Initial tensile modulus_____ 33.

Work recovery as follows:

For 1% elongation—91% work recovery.
2% elongation—97% work recovery.
3% elongation—91% work recovery.

As many widely different embodiments can be made without departing from the spirit and scope of this invention, it is to be understood that said invention is in no way restricted save as set forth in the appended claims.

I claim:

1. A process for producing a fiber-forming synthetic linear condensation polymer which comprises reacting, under polymerizing conditions and in proportions suitable for preparing a polymer of fiber-forming molecular weight, difunctional reactants of the group consisting of an alcohol, an amine and a carboxylic acid and the ester and amide forming derivatives thereof, said reactants being capable of yielding a linear condensation polymer of the group consisting of a linear polyamide and a linear polyester, the difunctional groups of at least one of the said reactants being joined by the divalent radical

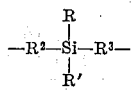

wherein R and R' are any monovalent hydrocarbon radical and R² and R³ are any divalent hydrocarbon radical from the group consisting of an aromatic and a cycloaliphatic hydrocarbon radical and continuing the reaction under polymerizing conditions until the polymer melt produces a fiber when a rod is touched to its surface and drawn away.

2. A process for producing a fiber-forming synthetic linear condensation polymer which comprises reacting, under polymerizing conditions and in proportions suitable for preparing a polymer of fiber-forming molecular weight, difunctional reactants of the group consisting of an alcohol, an amine and a carboxylic acid and the ester and amide forming derivatives thereof, the said reactants being capable of yielding a linear condensation polymer of the group consisting of a linear polyamide and a linear polyester, the difunctional groups of at least one of the said reactants being joined by the divalent radical

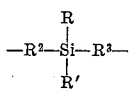

wherein R and R' are any monovalent hydrocarbon radical, and R² and R³ are any divalent hydrocarbon radical selected from the group consisting of an aromatic and a cycloaliphatic hydrocarbon radical and continuing the reaction under conditions effective to remove volatile products of reaction, until a polymer having an intrinsic viscosity of at least 0.4 is obtained.

3. A process for producing a fiber-forming synthetic linear polyamide which comprises reacting under polymerizing conditions and in proportions suitable for preparing a polymer of fiber-forming molecular weight, as polymer-forming reactants, a diamine and a compound from the group consisting of a dicarboxylic acid and the amide forming derivative thereof, the difunctional groups of at least one of the said reactants being joined by the divalent radical

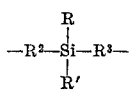

wherein R and R' are any monovalent hydrocarbon radical, and R² and R³ are any divalent hydrocarbon radical selected from the group consisting of an aromatic and a cycloaliphatic hydrocarbon radical, the radicals R² and R³ being attached to the functional groups of said polymer-forming reactants, and continuing the reaction under conditions effective to remove volatile by-products of reaction until the polymer melt produces a fiber when a rod is touched to its surface and drawn away.

4. A process for producing a fiber-forming synthetic linear polyamide which comprises reacting, under polymerizing conditions and in substantially equal molecular proportions, a diamine and a dicarboxylic acid, the difunctional groups of at least one of the reactants being joined by the divalent radical

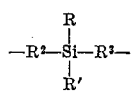

wherein R and R' are any monovalent hydrocarbon radical and R² and R³ are any divalent hydrocarbon radical selected from the group consisting of an aromatic and a cycloaliphatic hydrocarbon radical, the radicals R² and R³ being attached to the functional groups of said reactants, and continuing the reaction under conditions effective to remove volatile by-products of reaction until a polymer having an intrinsic viscosity of at least 0.4 is obtained.

5. A process for producing a fiber-forming synthetic linear polyester which comprises reacting, under polymerizing conditions and in proportions suitable for preparing a polymer of fiber-forming molecular weight, a dihydric alcohol and a compound from the group consisting of a dicarboxylic acid and an ester-forming derivative thereof, the difunctional groups of at least one of the reactants being joined by the divalent radical

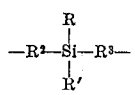

wherein R and R' are any monovalent hydrocarbon radical and R² and R³ are any divalent hydrocarbon radical selected from the group consisting of an aromatic and a cycloaliphatic hydrocarbon radical, the radicals R² and R³ being attached to the functional groups of said reactants, and continuing the reaction under conditions effective to remove volatile by-products of reaction until a polymer melt produces a fiber when a rod is touched to its surface and drawn away.

6. A fiber-forming synthetic linear condensation polymer of the group consisting of a linear polyamide, formed by polymerizing fiber-forming proportions of difunctional compounds containing a radical from the class consisting of amino and carboxyl and the amide-forming derivatives thereof, and a linear polyester, formed by polymerizing fiber-forming proportions of difunctional compounds containing a radical from the class consisting of hydroxyl and carboxyl and the ester-forming derivatives thereof, the said linear condensation polymer containing as a linear component in each recurring structural unit at least one divalent radical of the formula

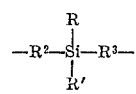

wherein R and R' are any monovalent hydrocarbon radical, and R² and R³ are any divalent hydrocarbon radical from the group consisting of an aromatic and a cycloaliphatic hydrocarbon radical the melt of the said condensation polymer producing a fiber when a rod is touched to its surface and drawn away.

7. The synthetic linear condensation polymer of claim 6 in the form of an artificial fiber exhibiting orientation along the fiber axis.

8. A fiber-forming synthetic linear polyester formed by polymerizing fiber-forming proportions of difunctional compounds containing a radical from the class consisting of hydroxyl and carboxyl and the ester-forming derivatives thereof, the said synthetic linear polyester containing as a linear component in the chain of each recurring structural unit at least one radical of the formula

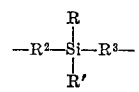

wherein R and R' are any monovalent hydrocarbon radical, and R² and R³ are any divalent hydrocarbon radical from the group consisting of an aromatic and a cycloaliphatic hydrocarbon radical the melt of the said linear polyester producing a fiber when a rod is touched to its surface and drawn away.

9. The polyester of claim 8 in the form of an artificial fiber exhibiting orientation along the fiber axis.

10. A fiber-forming synthetic linear polyamide formed by polymerizing fiber-forming proportions of difunctional compounds containing a radical from the class consisting of amino and carboxyl and the amide forming derivatives thereof, the said synthetic linear polyamide containing as a linear component in the chain of each recurring structural unit at least one radical of the formula

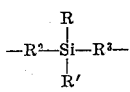

wherein R and R' are any monovalent hydrocarbon radical, and $R^2$ and $R^3$ are any divalent hydrocarbon radical from the group consisting of an aromatic and a cycloaliphatic hydrocarbon radical the melt of the said linear polyamide producing a fiber when a rod is touched to its surface and drawn away.

11. The polyamide of claim 10 in the form of an artificial fiber exhibiting orientation along the fiber axis.

12. The synthetic linear polyamide of claim 10 formed by reacting under polymerizing conditions, a diamine and bis(p-carboxyphenyl) dimethylsilane.

13. The synthetic linear polyamide of claim 12 wherein the diamine is hexamethylenediamine.

14. The synthetic linear polyamide of claim 12 wherein the diamine is decamethylenediamine.

15. The synthetic linear polyamide of claim 12 wherein the diamine is bis (p-aminomethylphenyl) dimethylsilane.

16. The structure of claim 11 wherein the synthetic linear condensation polymer is formed by reacting under polymerizing conditions a diamine and bis (p-carboxyphenyl) dimethylsilane.

17. The structure of claim 16 wherein the diamine is hexamethylenediamine.

18. The structure of claim 16 wherein the diamine is decamethylenediamine.

19. The structure of claim 16 wherein the diamine is bis (p-aminomethylphenyl) dimethylsilane.

20. As the synthetic linear polyester of claim 8, the esterification product of dicarboxyphenyldimethylsilane and a dihydric alcohol.

21. A polyester in accordance with claim 20 in which the alcohol is ethylene glycol.

22. The polyester of claim 21 in which the proportion of alcohol to acid is at least one mol of alcohol per mol of acid.

23. The polyester of claim 21 wherein the alcohol and acid components are present in substantially equimolecular proportions.

24. The structure of claim 9 wherein the synthetic linear condensation polymer is formed by reacting under polymerizing conditions a glycol and bis (p-carboxyphenyl) dimethylsilane.

25. The structure of claim 22 wherein the glycol is ethylene glycol.

References Cited in the file of this patent

UNITED STATES PATENTS

| | | |
|---|---|---|
| 2,071,250 | Carothers | Feb. 16, 1937 |
| 2,517,146 | Tyler | Aug. 1, 1950 |
| 2,601,646 | Tyler | June 24, 1952 |